BEST AVAILABLE COPY

March 16, 1954 R. J. DUFOUR Re. 23,800

REMOTE METER REGISTRATION DEVICE

Original Filed Feb. 2, 1951 2 Sheets-Sheet 1

INVENTOR

Raymond J. Dufour

BY Brown, Jackson, Boettcher & Dienner,

ATTORNEYS

BEST AVAILABLE COPY

March 16, 1954 R. J. DUFOUR Re. 23,800

REMOTE METER REGISTRATION DEVICE

Original Filed Feb. 2, 1951 2 Sheets-Sheet 2

INVENTOR

Raymond J. Dufour

BY Brown, Jackson, Boettcher & Dienner,

ATTORNEYS

Reissued Mar. 16, 1954

BEST AVAILABLE COPY

Re. 23,800

UNITED STATES PATENT OFFICE 23,800

REMOTE METER REGISTRATION DEVICE

Raymond J. Dufour, Wheaton, Ill.

Original No. 2,633,296, dated March 31, 1953, Serial No. 208,996, February 2, 1951. Application for reissue April 21, 1953, Serial No. 350,277

16 Claims. (Cl. 235—91)

Matter enclosed in heavy brackets [ ] appears in the original patent but forms no part of this reissue specification; matter printed in italics indicates the additions made by reissue.

This invention relates to registration devices for gas meters, and has to do with registration devices which may be placed remote from the meter and will indicate accurately the amount or volume of gas which has passed through the meter during any given time.

It is the common practice for meter readers to visit residences and other establishments periodically for reading the gas meters to determine the amount of gas which has been supplied to the resident or user. Gas meters commonly are positioned in the basements of houses and like establishments or in other suitable places indoors, and it frequently happens that the reader when calling to read the meter cannot obtain access thereto due to absence of the resident, or other causes. The objections to that are obvious. With a view to avoiding that condition, various proposals have been made for providing registration or indicating devices exterior of the residence, so as to be at all times accessible to the reader, and operatively connected to the meter within the residence. Such devices with which I am familiar are, in general, rather complicated and expensive and do not always operate satisfactorily.

My invention is directed to a registration device of comparatively simple and inexpensive construction, which may be placed exteriorly of the residence, so as to be at all times accessible to the meter reader, and which will operate satisfactorily and in a manner to indicate accurately the amount or volume of gas which has passed through the associated meter during the period since the last reading thereof. The registration device of my invention may be applied to gas meters of known type without necessitating any material change in the meter itself. In its broader aspects, my invention comprises a chamber having a movable wall and subject to the gas pressure within the meter, means actuated by the measuring mechanism of the meter for moving the movable wall of the chamber in one direction and means for moving the movable wall in the other direction, in conjunction with a second chamber exterior of the meter and having a movable wall operatively connected to a counting or registration mechanism, this second chamber being connected to the first chamber so as to cause actuation of the registration or counting mechanism responsive to movements of the movable wall of the latter chamber. *While my invention, in the preferred form thereof shown, is particularly suitable for use with meters for fuel gas, it is also applicable, in its broader*

*aspects, to meters for other gases and fluids.* Further objects and advantages of my invention will appear from the detail description.

Figure 1:
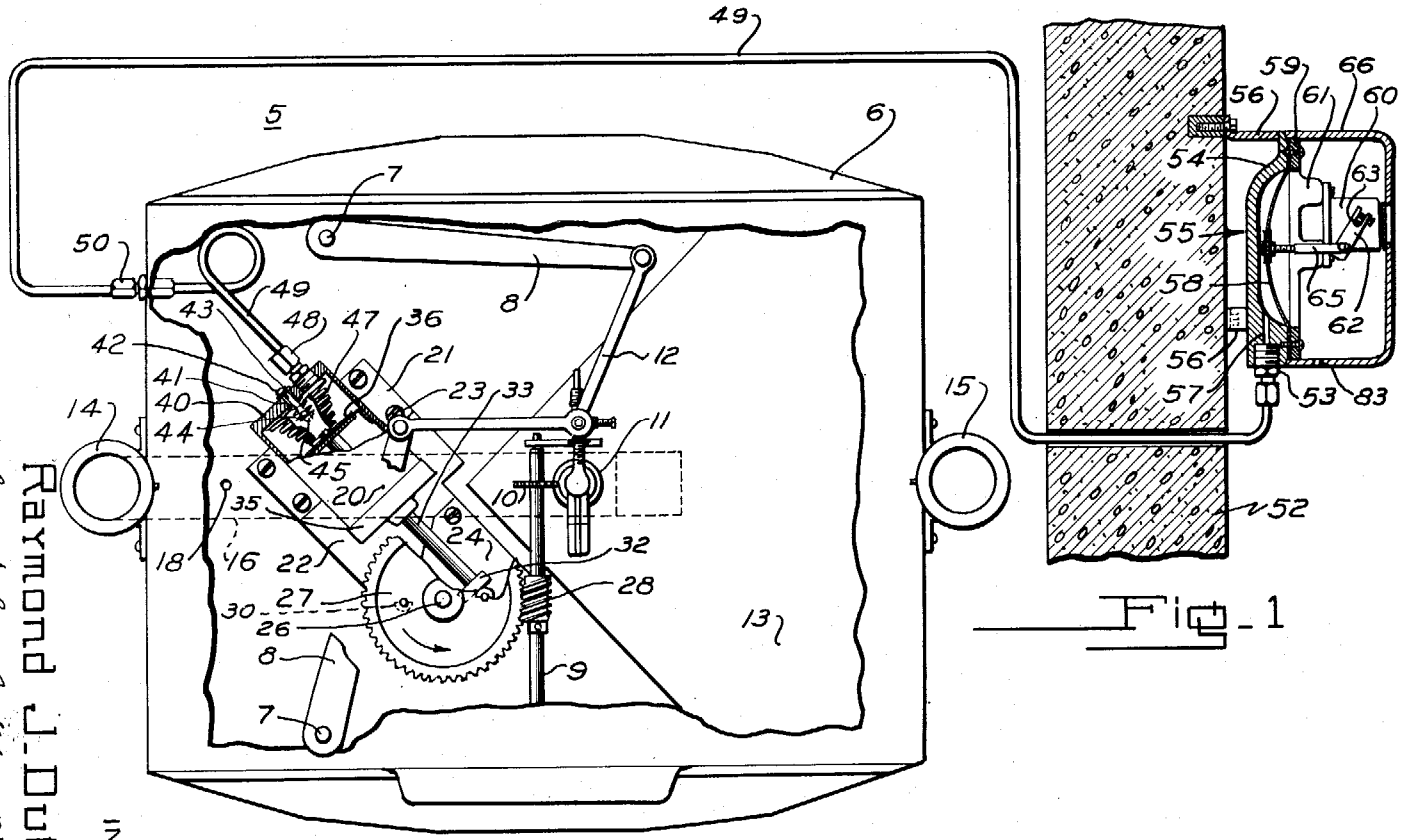
Figure 1 is a view showing in plan a gas meter, with the top wall thereof broken away in major portion, and registration means embodying my invention applied to the meter, certain parts being broken away and shown in section and certain other parts being shown in section.

I have shown the registration device of my invention as used with a gas meter 5 of known type. This gas meter 5 is a Glover type of meter and is provided with measuring mechanism enclosed within a box like casing 6. The measuring mechanism comprises bellows (not shown), flag rods 7 actuated by the bellows, flag arms 8 on the upper ends of rods 7, and an index shaft 9 on which is secured a gear 10 driven by a worm 11 which is rotated in a known manner by known operating connections to short flag arms 12 hinged to the long flag arms 8. The casing 6 is provided interiorly with a horizontal partition or valve table 13 defining with the portion of casing 6 extending thereabove a space commonly termed the gallery chamber. The flag arms 8 and 12 and associated mechanism just described are disposed above valve table 13 in the gallery chamber. Inlet and outlet tubes 14 and 15, respectively, are disposed at opposite sides of casing 6, and an inlet channel 16 extends from tube 14 inwardly along the underface of valve table 13 to suitable valve means (not shown), actuated by the mechanism which drives worm 11, for admitting gas to and exhausting gas from the two bellows alternately. The gas exhausted through the valve means leaves the meter through the outlet tube 15. The gallery chamber is kept filled with gas at meter operating pressure, for a purpose to be explained presently. Normally, leakage of gas through the stuffing box of the tangent arm shaft of the operating connections between the worm 11 and the flag arms 8 and 12 may be relied upon for maintaining the gallery chamber filled with gas

-ST AVAILABLE COPY at meter operating pressure, or substantially so. Preferably, however, I provide a small opening 18 through valve table 13 into the inlet channel 16, for that purpose. In some meters of the newer types the meter valves are not partitioned off from the gallery chamber or space above the bellows chamber, and in such meters the space in the upper portion of casing 6 is in direct communication with the gas inlet so as to be maintained filled with gas under inlet or meter operating pressure. Accordingly, in such meters, there is no necessity for providing the opening 18, nor for relying upon leakage of gas to maintain the pressure within the chamber or space within which the registration device of my invention is, in part, disposed. As will be understood from what has been said, the meter 5 is of known construction and operation and need not be further described in detail.

The registration device of my invention comprises a cylinder 20 provided with base flanges 21 seating upon a base plate 22 and secured thereto in a suitable manner, conveniently by means of screws 23 which pass through base plate 22 and serve also to secure the latter to valve table 13, upon the upper face of which base plate 22 seats. A table 24 is supported above the inner portion of base plate 22, by posts 25, and receives a rotatably mounted vertical shaft 26 fitting through a corresponding opening in plate 24 and having at its lower end a stepped bearing in base plate 22. A worm gear 27 is secured on shaft 26 and meshes with a worm 28 secured on the index shaft 9. In the operation of the meter 5, the worm gear 27 is rotated counterclockwise, as viewed in Figure 1, at low speed.

Figure 2:
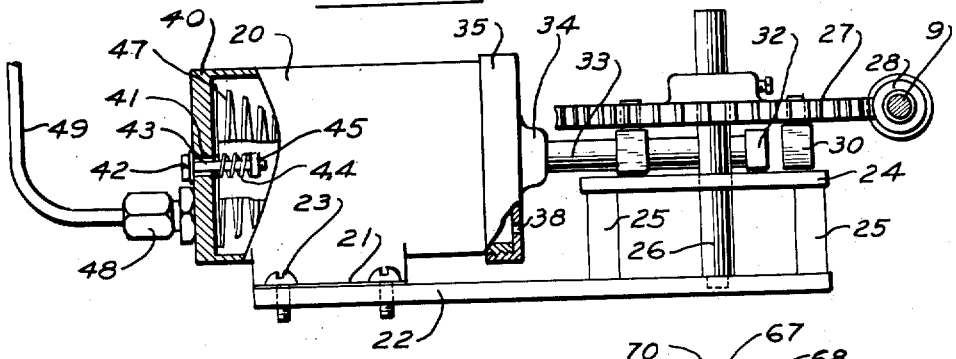
Figure 2 is a side view, on an enlarged scale, of the cylinder and associated parts disposed within the meter casing, the cylinder being partly broken away and in section.
Figure 3:
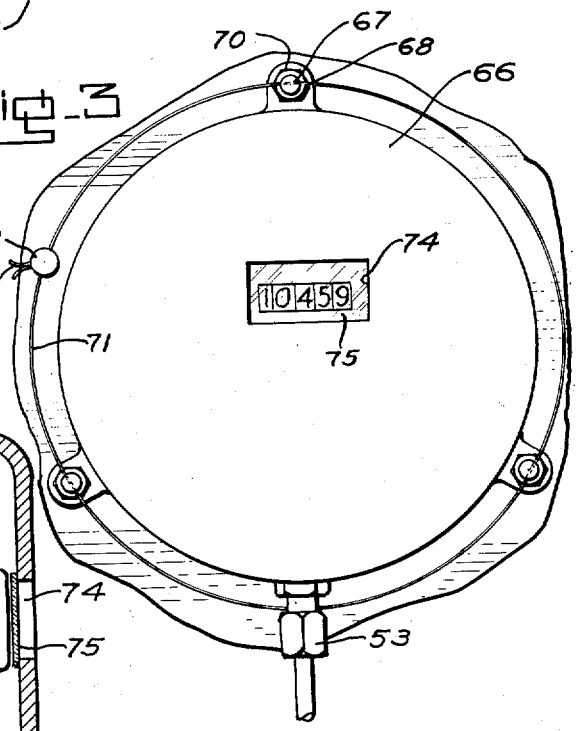
Figure 3 is a front view, on an enlarged scale, of the exterior registration means enclosed within its housing.

Two oppositely directed abutment members or pins 30, preferably of approximately semi-cylindrical cross section, as shown more clearly in Figure 1, are secured to the worm gear 27 at diametrically opposite points thereof and extend downward therefrom with their ends in proximity to the table 24. The pins 30 are disposed to contact head 32 at the outer end of a piston rod 33 slidable through boss 34 of a cylinder head 35 suitably secured on the inner end of cylinder 20, conveniently by being screwed thereon. A piston 36 (Figure 1), preferably of cupped form with its flange directed toward the inner cylinder head 35, operates in cylinder 20 with a close fit therein effective to prevent leakage of gas about piston 36 from the inner portion of cylinder 20 but not presenting appreciable frictional resistance to movement of piston 36 within cylinder 20. The inner cylinder head 35 is provided with one or more openings, one of which is shown at 38 in Figure 2, establishing free communication between the inner end of cylinder 20 and the gallery chamber or spaced within which that cylinder is disposed, for a purpose which will appear more fully presently.

The outer end of cylinder 20 is closed by a head 40 conveniently formed integral therewith. This head 40 is provided with an inlet port 41 disposed coaxially of cylinder 20 and normally closed by an outwardly opening and inwardly closing valve 42 having a stem 43 projecting inwardly of cylinder 20 a short distance beyond head 40. The valve 42 is urged in closing direction, and normally is held closed, by a compression spring 44 disposed about stem 43 and confined between cylinder head 40 and an abutment 45 secured on the inner end of stem 43. As the piston 36 approaches the limit of its inward movement into the cylinder 20, the inner end of piston rod 33, which projects a short distance inward beyond piston 36, contacts valve stem 43 and moves the valve 42 outward into open position, in opposition to the compression spring 44, for a purpose to be explained more fully later. In that connection, it will be noted that the port 41 in head 40 is of appreciably greater diameter than the valve stem 43, so that upon opening of valve 42 communication is established between the outer end of cylinder 20 and the gallery chamber or space within which that cylinder is disposed.

A spirally wound compression spring 47 is suitably mounted on the inner face of the outer cylinder head 40 and extends therefrom toward piston 36 a substantial distance beyond stem 43 of the valve 42. A tubular fitting 48, of known type, is mounted in cylinder head 40 and opens into the outer end of cylinder 20. A conduit 49, conveniently a length of copper tubing of appropriate diameter, is secured at one end in fitting 48 and opens therethrough into the cylinder 20. The tube 49 passes through the adjacent side wall of meter casing 6, by means of a fitting 50 of known type which provides a gas tight seal with the wall of casing 6 and about the conduit or tube 49. The tube 49 passes through a wall 52, which may be the foundation wall of a house or dwelling, it being assumed for purposes of description that the meter 5 is disposed adjacent the inner face of wall 52 within the basement of dwelling. The outer end of tube 49 is secured in a fitting 53, of known type, mounted in a recessed base 54 of a chamber 55 suitably mounted, as by brackets 56, on wall 52 at the outer face thereof. Fitting 53 opens into the recess of base 54 through a passage 57 therein. A flexible diaphragm 58 extends across the outer side of base 54, to which it is suitably secured, conveniently by a clamping ring 59. The base 54 and the diaphragm thus provide a chamber having a movable wall defined by the diaphragm 58, this chamber being in communication through the tube 49 with the outer end of cylinder 20. A counter 60, which may be a cyclometer counter of known type, is disposed outwardly beyond diaphragm 58. Conveniently, counter 60 is mounted on bosses 61 on the clamp ring 59. Counter 60 is operated by means of an arm 62 clamped on shaft 63 thereof, movement of arm 62 in clockwise direction, as viewed in Figure 1, being effective for advancing the counter one space and movement of arm 62 in counterclockwise direction being ineffective for operating the counter, as is known. Arm 62 is adjustably connected, by a rod 65 to diaphragm 58 centrally thereof. The counter and associated parts are enclosed by a cup shaped cover 66 fitting about ring 59 and secured to base 54 in a suitable manner. Preferably, screw studs 67, secured in base 54 extend through bosses 68 of cover 66, nuts 70 being threaded onto studs 67 and seating against bosses 68, there being a seal wire 71 inserted through studs 67 with its ends secured together by a lead seal 72. The cover 66 is provided, at the front thereof, with an opening 74 closed at its inner side by a glass plate or panel 75, providing a window through which the numbers on the discs of the cyclometer counter may readily be viewed.

Figure 4:
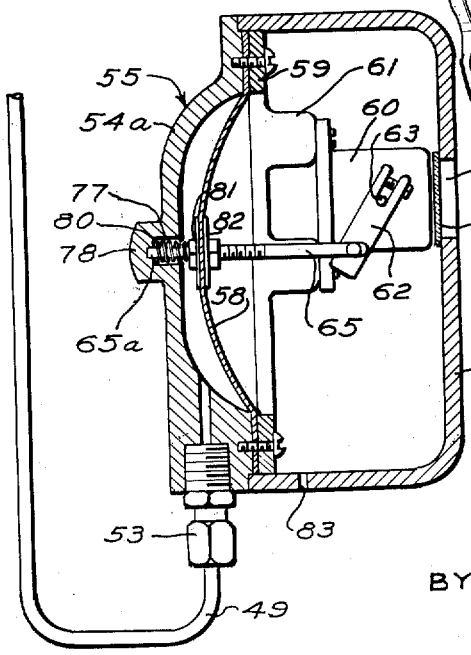
Figure 4 is a central vertical sectional view, on an enlarged scale, of the exterior registration means and its housing, showing a slight modification of the registration means.

The diaphragm chamber structure shown in the modification of Figure 4 is the same as that shown in Figure 1, except that the rod 65 is provided with a rearward extension 65a of reduced diameter which projects into a recess 77

BEST AVAILABLE COPY in a boss 78 projecting from base 54a of the diaphragm chamber. A compression spring 80 is disposed about extension 65a of rod 65 and is confined between boss 78 and the inner one of two nuts 81 threaded on rod 65 for clamping the central area of diaphragm 58 between two annular plates 82. The cover 66 is provided with a port 83 which permits free entry of atmospheric air, for a purpose to be explained presently.

In the operation of the meter 5, the worm wheel 27 is rotated slowly in counterclockwise direction, as view in Figure 1, turning through one complete rotation for each two hundred cubic feet, for example, of gas passing through the meter, it being assumed that the indicator or counter 60 is to be actuated once for each one hundred cubic feet of gas passing through the meter. During turning of the worm wheel 27 through one-half rotation, one of the pins 30 thereof contacts head 32 of piston rod 33 and moves the latter, and with its piston 36, inwardly of cylinder 20 toward head 40 thereof. During such inward movement of the piston 36, the gas enters the inner end of cylinder through opening 38 so as to avoid production of a partial vacuum such as would interfere with free inward movement of piston 36. As will be understood from what has been said, the piston 36 moves inwardly of cylinder 20 quite slowly. In the continued movement of piston 36 toward cylinder head 40, it contacts the inner end of compression spring 47 and places the latter under compression. As piston 36 approaches cylinder head 40, the inner end of piston rod 33 contacts valve stem 43 and moves it outward, thus opening the valve 42. Opening of valve 42 admits gas under inlet or meter pressure to the outer end of cylinder 20 and thence through fitting 48 and tube 49 to the diaphragm chamber 55. The gas entering chamber 55 forces the moveable wall or diaphragm 58 thereof outward, thus turning arm 62 and shaft 63 of the counter 60 in counterclockwise direction, as viewed in Figures 1 and 4, ineffective for operating the counter 60, as above noted. In the continued rotation of worm gear 27 pin 30 thereof passes out of contact with head 32 of piston rod 33, releasing the latter and the piston 36 for outward movement. When that occurs, the compression spring 47 moves the piston 36 rapidly outward in cylinder 20, toward head 35 thereof. In the first part of this outward movement of piston 36, valve 42 closes under the influence of its associated compression spring 44, and in the continued outward movement of piston 36 gas is withdrawn through tube 49 from the chamber 55. That creates a partial vacuum within chamber 55 and the moveable wall or diaphragm 58 thereof is then forced inward by atmospheric pressure, thus swinging arm 62 and shaft 63 of counter 60 in clockwise direction, as viewed in Figures 1 and 4, effective for advancing the counter one space. In that manner, the counter 60 is advanced one space for each one hundred cubic feet, for example, of gas passing through the meter 5.

The inward movement of the piston 36 is quite slow, as above noted, depending upon the amount of gas passing through the meter, and may require several days. During such inward movement of the piston 36 slow leakage of gas about the piston may occur from between the latter and cylinder head 40, such that no effective pressure is created in the chamber 55, such as would move the moveable wall or diaphragm 58 thereof outwardly to an appreciable extent. Under certain conditions, as where large volumes of gas pass through the meter in comparatively short time periods and substantial leakage about the piston 36 does not occur, the movement of piston 36 inward of cylinder 20 toward head 40 thereof may create sufficient pressure within the diaphragm chamber 55 to cause outward movement of diaphragm 58. Such outward movement of the diaphragm would not, however, affect the accuracy of operation of the counter 60 which, as noted, is advanced one space only when the diaphragm 58 moves inward of chamber 55. Assuming the diaphragm 58 to have been moved outward during the inward movement of piston 36 toward cylinder head 40, the rapid outward movement of piston 36 under the influence of compression spring 47, from its innermost position would be effective to produce a partial vacuum within the diaphragm chamber 55, so as to cause inward movement of diaphragm 58 and actuation of the counter 60 in the manner above described.

In certain cases, where the inlet or meter pressure of the gas is exceptionally low, the compression spring 80 of the modification shown in Figure 4 supplements the pressure of the gas entering the diaphragm chamber 55, to assure that the diaphragm 58 will be moved outward sufficiently to assure proper operation of the counter upon inward movement of the diaphragm 58 under atmospheric pressure. Accordingly, where conditions of low gas pressure are apt to be encountered, I preferably provide the compression spring 80, as and for the purpose stated. As will be understood from what has been said the compression spring 80 is rather light and exerts outward pressure on diaphragm 58 less than the inward atmospheric pressure exerted thereon. In cases where the entering or inlet gas pressure is adequate to assure full outward movement of diaphragm 58, the compression spring 80 may be omitted.

As above indicated, and as will be understood, changes in detail may be resorted to without departing from the field and scope of my invention, and I intend to include all such variations, as fall within the appended claims, in this application in which the preferred forms only of my invention have been disclosed.

I claim:

1. In remote registration means for use with a gas meter having mechanism for measuring gas flowing therethrough; a chamber positionable exteriorly of the meter and closed at one side by a movable wall, a counter, operating connections between said wall and counter, and means actuated by the meter mechanism effective for admitting gas under pressure from the meter to said chamber and then withdrawing gas from said chamber and thereby producing a partial vacuum therein, responsive to flow of a predetermined volume of gas through the meter.

2. In remote registration means for use with a gas meter having mechanism for measuring gas flowing therethrough and a space receiving gas at meter operating pressure; a chamber potionable exteriorly of the meter and closed at one side by a movable wall, a counter, operating connections between said wall and said counter, and means actuated by the meter mechanism effective for connecting the gas receiving space of the meter to said chamber and then closing the latter to the gas receiving space of the meter and withdrawing gas from said chamber thereby producing a partial vacuum therein, responsive to flow of a predetermined volume of gas through the meter.

BEST AVAILABLE COPY

3. In remote registration means for use with a gas meter comprising a casing and mechanism therein for measuring gas flowing therethrough, the meter casing having therein a space receiving gas at meter operating pressure; a chamber positionable exteriorly of the meter casing and closed at one side by a movable wall, a counter, operating connections between said wall and counter, a conduit opening into said chamber, and means actuated by the meter mechanism effective for connecting said conduit to the gas receiving space of the meter casing and then closing said conduit to the gas receiving space of the meter casing and withdrawing gas through said conduit from said chamber thereby producing a partial vacuum therein, responsive to flow of a predetermined volume of gas through the meter.

4. In remote registration means for use with a gas meter comprising a casing and mechanism therein for measuring gas flowing therethrough, the meter casing having therein a space receiving gas at meter operating pressure; a chamber positionable exteriorly of the meter casing closed at one side by a movable wall, a counter, operating connections between said wall and counter, a chamber within the gas receiving space of the meter casing normally closed thereto and having a movable wall yieldingly urged outward, a conduit connecting said second chamber to said first chamber, means actuated by the meter mechanism for moving said wall of said second chamber inward a predetermined distance and then releasing it for outward movement, responsive to flow of a predetermined volume of gas through the meter, and means for opening said second chamber to the gas receiving space of the meter casing as said wall of said second chamber moves inward and closing said second chamber to the gas receiving space of the meter casing during outward movement of said wall of said second chamber.

5. In remote registration for use with a gas meter comprising a casing and mechanism therein for measuring gas flowing therethrough, the meter casing having therein a space receiving gas at meter operating pressure; a chamber positionable exteriorly of the meter casing closed at one side by a movable wall, a counter, operating connections between said wall and counter, a chamber within the gas receiving space of the meter casing normally closed thereto and having a movable wall yieldingly urged outward, a conduit connecting said second chamber to said first chamber, means actuated by the meter mechanism for moving said wall of said second chamber inward a predetermined distance and then releasing it for outward movement, responsive to flow of a predetermined volume of gas through the meter, and means actuated by said movable wall of said second chamber for opening said second chamber to the gas receiving space of the meter casing as said wall of said second chamber moves inward and closing said second chamber to the gas receiving space of the meter casing during outward movement of said wall of said second chamber.

6. In remote registration means for use with a gas meter comprising a casing and mechanism therein for measuring gas flowing therethrough, the meter casing having therein a space receiving gas at meter operating pressure; a chamber positionable exteriorly of the meter casing closed at one side by a movable wall, a counter, operating connections between said wall and counter, a cylinder within the gas receiving space of the meter casing open thereto at one end and closed at its other end, a piston operating in said cylinder yieldingly urged outward thereof, a conduit connecting said cylinder adjacent its said other end to said chamber, said cylinder having an inlet port adjacent its said other end, a valve normally closing said port, means driven by the meter mechanism for moving said piston inward of said cylinder into proximity to said other end thereof and then releasing it for outward movement, responsive to flow of a predetermined volume of gas through the meter, and means actuated by said piston for opening said valve as said piston approaches the limit of its inward movement and releasing said valve for closing when said piston is released for outward movement.

7. In remote registration means for use with a gas meter comprising a casing and mechanism therein for measuring gas flowing therethrough, the meter casing having therein a space receiving gas at meter operating pressure; a diaphragm chamber positionable exteriorly of the meter casing closed at one side by a flexible diaphragm, a counter, operating connections between said diaphragm and counter, a cylinder within the gas receiving space of the meter casing open thereto at one end and closed at its other end by a head having an inlet port, a conduit connecting said other end of said cylinder to said chamber, a normally closed valve controlling said port and yieldingly urged in closing direction, a piston operating in said cylinder yieldingly urged outward thereof, means driven by the meter mechanism for moving said piston inward of said cylinder into proximity to said other end thereof and then releasing it for outward movement responsive to flow of a predetermined volume of gas through the meter, and means actuated by said piston for opening said valve as said piston approaches the limit of its inward movement and releasing said valve for closing when said piston is released for outward movement.

8. In remote registration means for use with a gas meter comprising a casing and mechanism therein for measuring gas flowing therethrough, the meter casing having therein a space receiving gas at meter operating pressure; a diaphragm chamber positionable exteriorly of the meter casing closed at one side by a flexible diaphragm, a counter, operating connections between said diaphragm and counter, a cylinder within the gas receiving space of the meter casing open thereto at its inner end and closed at its outer end by a head having an inlet port, a conduit connecting the outer end of said cylinder to said chamber, a normally closed valve controlling said port and yieldingly urged in closing direction, a piston operating in said cylinder yieldingly urged outward thereof, a piston rod extending from said piston outward of said cylinder beyond said inner end thereof, and a rotatably mounted member driven by the meter mechanism and having an abutment disposed to contact the outer end of said piston rod and move said piston inward of said cylinder into proximity to said head and then pass out of contact with said piston rod to release said piston for outward movement, during rotation of said member, said valve and piston having cooperating means for opening said valve when said piston approaches said head and releasing said valve for closing incident to release of said piston for outward movement.

BEST AVAILABLE COPY

9. In remote registration for use with a gas meter comprising a casing and mechanism therein for measuring gas flowing therethrough, the meter casing having therein a space receiving gas at meter operating pressure; a diaphragm chamber positionable exteriorly of the meter casing closed at one side by a flexible diaphragm, a counter, operating connections between said diaphragm and counter, a substantially horizontal cylinder within the gas receiving space of the meter casing open thereto at its inner end and closed at its outer end by a head having an inlet port, a conduit connecting the outer end of said cylinder to said chamber, a normally closed valve controlling said port and yieldingly urged in closing direction, a piston operating in said cylinder yieldingly urged outward thereof, a piston rod extending from said piston outward of said cylinder beyond said inner end thereof, and a member mounted for rotation about a substantially vertical axis and driven by the meter mechanism and having an abutment disposed to contact the outer end of said piston rod and move said piston inward of said cylinder into proximity to said head and then pass out of contact with said piston rod to release said piston for outward movement, during rotation of said member, said valve and piston having cooperating means for opening said valve when said piston approaches said head and releasing said valve for closing incident to release of said piston for outward movement.

10. In remote registration means for use with a gas meter having mechanism for measuring gas flowing therethrough; a diaphragm chamber positionable exteriorly of the meter closed at one side by a flexible diaphragm exposed at its outer face to atmospheric pressure, means yieldingly urging said diaphragm outward by pressure less than atmospheric, a counter, operating connections between said diaphragm and counter, and means actuated by the meter mechanism effective for admitting gas under pressure from the meter to said chamber and then withdrawing gas from said chamber and thereby producing a partial vacuum therein sufficient to cause inward movement of said diaphragm by atmospheric pressure, responsive to flow of a predetermined volume of gas through the meter.

*11. In remote registration means for use with a meter comprising a casing and mechanism therein for measuring the volume of fluid passing therethrough and driven by the flow of such fluid; a first chamber positionable exteriorly of the meter casing and closed at one side by a movable wall, a counter, operating connections between said wall and counter, a second chamber within the meter casing having a movable wall, yielding means urging said movable wall of said second chamber outward, a conduit connecting said second chamber to said first chamber, means for admitting fluid under pressure to said chambers and conduit during inward movement of said movable wall of said second chamber effective to thereby cause outward movement of said movable wall of said first chamber and for cutting off admission of fluid under effective pressure to said chambers and conduit during the outward movement of said movable wall of said second chamber, and means actuated by the meter mechanism for moving said movable wall of said second chamber inward in opposition to said yielding means and then abruptly releasing said movable wall of said second chamber, responsive to flow of a predetermined volume of fluid through the meter, said yielding means being effective for moving said movable wall of said second chamber when released outward rapidly thereby reducing the pressure in said chambers and conduit effective for causing inward movement of said movable wall of said first chamber.*

*12. In remote registration means for use with a meter comprising a casing and mechanism therein for measuring the volume of fluid passing therethrough and driven by the flow of such fluid; a first chamber positionable exteriorly of the meter casing and closed at one side by a movable wall, a counter, operating connections between said wall and counter, a second chamber within the meter casing having a movable wall, energy storing spring means yieldingly urging said movable wall of said second chamber outward, a conduit connecting said second chamber to said first chamber, means for admitting fluid under pressure to said chambers and conduit during inward movement of said movable wall of said second chamber effective to thereby cause outward movement of said movable wall of said first chamber and for cutting off admission of fluid under effective pressure to said chambers and conduit during the outward movement of said movable wall of said second chamber, and means actuated by the meter mechanism for moving said movable wall of said second chamber inward in opposition to said spring means and then abruptly releasing said movable wall of said second chamber, responsive to flow of a predetermined volume of fluid through the meter, said spring means being placed under increasing stress by inward movement of said movable wall of said second chamber and being effective for moving said movable wall of said second chamber when released outward rapidly thereby reducing the pressure in said chambers and conduit effective for causing inward movement of said movable wall of said first chamber.*

*13. In remote registration means for use with a meter comprising a casing and mechanism therein for measuring the volume of fluid passing therethrough and driven by the flow of such fluid; a first chamber positionable exteriorly of the meter casing and closed at one side by a movable wall exposed to atmospheric pressure and closed at its other side by a fixed wall, a counter, operating connections between said movable wall and counter, a second chamber within the meter casing having a movable wall and an opposed fixed wall, energy storing spring means yieldingly urging said movable wall of said second chamber outward, a conduit connecting said second chamber to said first chamber, means for admitting fluid under pressure to said chambers and conduit during inward movement of said movable wall of said second chamber effective to thereby cause outward movement of said movable wall of said first chamber and for cutting off admission of fluid under effective pressure to said chambers and conduit during the outward movement of said movable wall of said second chamber, and means actuated by the meter mechanism for moving said movable wall of said second chamber inward in opposition to said spring means and then abruptly releasing said movable wall of said second chamber, responsive to flow of a predetermined volume of fluid through the meter, said spring means being placed under increasing stress by inward movement of said movable wall of said second chamber and being effective for moving said movable wall of said second chamber when*

BEST AVAILABLE COPY

*released outward rapidly thereby reducing the pressure in said chambers and conduit to subatmospheric pressure effective for causing inward movement of said movable wall of said first chamber.*

*14. In remote registration means for use with a meter comprising a casing and mechanism therein for measuring the volume of fluid passing therethrough and driven by the flow of such fluid; a first chamber positionable exteriorly of the meter casing and closed at one side by a movable wall exposed to atmospheric pressure and closed at its other side by a fixed wall, a counter, operating connections between said movable wall and counter, a second chamber within the meter casing having a movable wall and an opposed fixed wall provided with an inlet port for admission of fluid under pressure, a normally closed valve controlling said port, energy storing spring means yielding urging said movable wall of said second chamber outward, a conduit connecting said second chamber to said first chamber, and means actuated by the meter mechanism for moving said movable wall of said second chamber inward in opposition to said spring means and then abruptly releasing said movable wall of said second chamber, responsive to flow of a predetermined volume of fluid through the meter, said valve and said movable wall of said second chamber having cooperating means for opening said valve as said last mentioned wall approaches the limit of its inward movement and releasing said valve for closing as said movable wall of said second chamber starts its outward movement, said spring means being placed under increasing stress by inward movement of said movable wall of said second chamber and being effective for moving said movable wall of said second chamber when released outward rapidly thereby reducing the pressure in said chambers and conduit effective for causing inward movement of said movable wall of said first chamber.*

*15. In remote registration means for use with a meter having mechanism for measuring the volume of fluid flowing therethrough; a chamber positionable exteriorly of the meter and closed at one side by a movable wall subject to atmospheric pressure, a counter, operating connections between said wall and counter, and means actuated by the meter mechanism for admitting to said chamber fluid under pressure effective for causing outward movement of said wall and then abruptly withdrawing such admitted fluid from said chamber and thereby reducing the pressure therein to subatmospheric effective for causing inward movement of said wall by atmospheric pressure, independently of variations in pressure of the fluid being metered and responsive to flow of a predetermined volume of fluid through said meter.*

*16. In remote registration means for use with a meter comprising a casing and mechanism therein for measuring the volume of fluid passing therethrough; a first chamber positionable exteriorly of the meter casing and closed at one side by a movable wall, a counter, operating connections between said wall and counter, a second chamber within the meter casing having a movable wall, yielding means urging said movable wall of said second chamber in one direction, a conduit connecting said second chamber to said first chamber, means actuated by the meter mechanism for moving said movable wall of said second chamber in the opposite direction in opposition to said yielding means and then abruptly releasing said movable wall of said second chamber for rapid movement in said one direction under the influence of said yielding means, and means for admitting fluid to said chambers and conduit prior to said rapid movement of the movable wall of said second chamber while preventing free flow of fluid out of said chambers and conduit during said rapid movement of the movable wall of said second chamber.*

RAYMOND J. DUFOUR.

References Cited in the file of this patent

UNITED STATES PATENTS

| Number | Name | Date |
|---|---|---|
| 509,799 | Erhardt | Nov. 28, 1893 |
| 519,972 | Schneider | May 15, 1894 |
| 1,491,777 | Mawry | Apr. 22, 1924 |
| 2,553,842 | Bickel | May 22, 1951 |
| 2,553,843 | Bickel | May 22, 1951 |
| 2,633,750 | Langstaff | Apr. 7, 1953 |

FOREIGN PATENTS

| Number | Country | Date |
|---|---|---|
| 475,030 | Great Britain | Nov. 12, 1937 |